United States Patent
Yamamoto et al.

(10) Patent No.: US 12,098,972 B2
(45) Date of Patent: Sep. 24, 2024

(54) WEAR MEASUREMENT DEVICE AND WEAR MEASUREMENT METHOD FOR TIRE

(71) Applicant: Alps Alpine Co., Ltd., Tokyo (JP)

(72) Inventors: Akihito Yamamoto, Miyagi-ken (JP); Yoshihiro Sudo, Miyagi-ken (JP); Tokuo Nakamura, Niigata-ken (JP); Kazushige Sejimo, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 121 days.

(21) Appl. No.: 17/954,143

(22) Filed: Sep. 27, 2022

(65) Prior Publication Data

US 2023/0016943 A1 Jan. 19, 2023

Related U.S. Application Data

(63) Continuation of application No. PCT/JP2021/014348, filed on Apr. 2, 2021.

(30) Foreign Application Priority Data

Apr. 10, 2020 (JP) .................................. 2020-070842

(51) Int. Cl.
*G01M 17/02* (2006.01)
*B60C 11/24* (2006.01)
*G01N 27/72* (2006.01)

(52) U.S. Cl.
CPC ........... *G01M 17/02* (2013.01); *B60C 11/243* (2013.01); *B60C 11/246* (2013.01); *G01N 27/72* (2013.01)

(58) Field of Classification Search
CPC ..... B60C 11/24; B60C 11/243; B60C 11/246; G01B 7/00; G01M 17/02; G01N 27/72; G01N 27/82
See application file for complete search history.

(56) References Cited

U.S. PATENT DOCUMENTS 7,116,217 B2 * 10/2006 Okubo ................ B60C 23/0408
340/447
7,762,129 B2 * 7/2010 Niklas ................... B60C 11/246
73/8

(Continued)

FOREIGN PATENT DOCUMENTS

| JP | 2019-64433 A | 4/2019 | |
| JP | 2019-203831 A | 11/2019 | |
| WO | WO-2019107296 A1 * | 6/2019 | ............. B60C 11/24 |

OTHER PUBLICATIONS

International Search Report, No. PCT/JP2021/014348, Filed Apr. 2, 2021, International Publication No. WO2021/206023.

*Primary Examiner* — Vinh P Nguyen

(74) *Attorney, Agent, or Firm* — Beyer Law Group LLP

(57) ABSTRACT

A tire wear measurement device detects a magnetic field of a magnetic body embedded in a tread portion of a tire and measures the degree of wear of the tire from a change in the magnetic field. The tire wear measurement device includes a first magnetic field detection portion placed at a position at which the magnetic field of the magnetic body can be detected, and a second magnetic field detection portion disposed at a position at which the intensity of the magnetic field of the magnetic body differs from the intensity at the position at which the first magnetic field detection portion is disposed.

7 Claims, 3 Drawing Sheets

(56) References Cited

U.S. PATENT DOCUMENTS

| | | | |
|---|---|---|---|
| 8,240,198 B2 * | 8/2012 | Schade | G01B 7/26 |
| | | | 73/146 |
| 10,675,925 B1 * | 6/2020 | Oakes, III | B60C 23/0486 |
| 11,203,235 B2 * | 12/2021 | Haronian | B60C 23/0486 |
| 2007/0035386 A1 | 2/2007 | Pullini et al. | |
| 2016/0169657 A1 | 6/2016 | Ledoux et al. | |
| 2019/0359010 A1 | 11/2019 | Setokawa et al. | |
| 2021/0170804 A1 | 6/2021 | Tanno | |
| 2022/0397486 A1 * | 12/2022 | Decoster | G01D 5/145 |

* cited by examiner

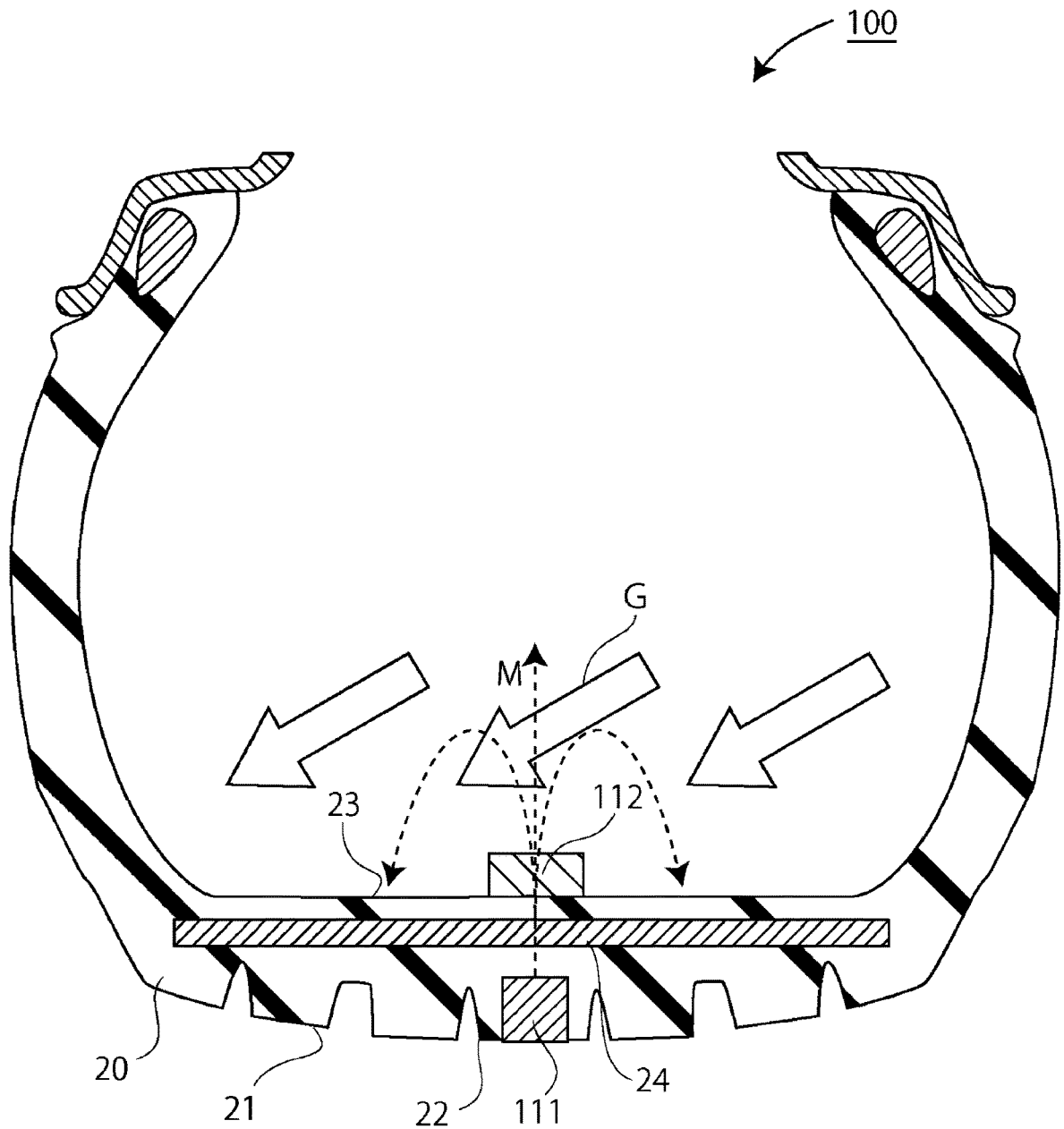

WEAR MEASUREMENT DEVICE AND WEAR MEASUREMENT METHOD FOR TIRE

CLAIM OF PRIORITY

This application is a Continuation of International Application No. PCT/JP2021/014348 filed on Apr. 2, 2021, which claims benefit of Japanese Patent Application No. 2020-070842 filed on Apr. 10, 2020. The entire contents of each application noted above are hereby incorporated by reference.

BACKGROUND OF THE INVENTION

1. Field of the Invention

The present invention relates to a wear measurement device and wear measurement method that detect wear of a tire according to the magnetic field of a magnet embedded in a tread.

2. Description of the Related Art

As wear of a tire progresses, degradation occurs in grip performance during traveling on a road surface and in drainage performance that drains water between the tire and a wet road surface during traveling on the wet road surface. To prevent this, the driver or vehicle manager visually inspects the wear state of the tread of the tire, and replaces the tire before it exceeds its usage limit to assure safety. In visual inspection, a slip sign provided in a groove of a tire, for example, is used. However, inspection work is complex and the wear state may be mistakenly evaluated. If the evaluation is mistaken, the tire the performance of which has lowered will continue to be used. This is not preferable from the viewpoint of safety.

In view of this, a method of measuring the degree of wear of a tire by a method other than a visual way has been proposed. For example, in U.S. Pat. No. 8,240,198, a method is described in which a magnet is embedded in a tread and the magnetic field of the embedded magnet is detected by using a magnetic sensor placed in the tire to evaluate the state of a groove and deterioration of the tire.

SUMMARY OF THE INVENTION

However, many steel wire layers are provided between the tread and an inner liner attached to the inner side surface of the tire. In a tire for a truck, for example, as many as four or five layers are provided. This is problematic in that the magnetic field from the magnet embedded in the tread is shielded by these steel wire layers and the magnetic field directed to the inside of the tire thereby changes. If the magnetic field is strengthened to suppress the influence of the steel wire layers, this is also problematic in that the strengthened magnetic field causes unnecessary objects such as pieces of iron to be attracted to the tire and a difference in flexibility between the magnet and the tire thereby becomes large.

As described above, the magnetic field of the magnet embedded in the tread cannot be strengthened so much. Therefore, a magnetic field detected by a wear detecting device is likely to be affected by an external magnetic field different from the magnetic field from the magnet embedded in the tread. Examples of the external magnetic field include the earth's magnetism. The influence of the earth's magnetism changes from moment to moment, depending on the direction of the travel of the vehicle, the orientation and rotational position of the tire, and the like. Therefore, if the amount of wear of the tire is evaluated according to the value of the magnetic flux density measured by a single magnetic sensor as in the method described in U.S. Pat. No. 8,240,198, error with respect to the actual amount of wear becomes large.

In view of this, the present invention provides a wear measurement device and wear measurement method, for a tire, that can precisely detect wear of a tire with the suppression of the influence of an external magnetic field such as the earth's magnetism The present invention notes that when the magnetic field of a magnet embedded in a tread is detected, an external magnetic field such as the earth's magnetism is a cause of a drop in precision in wear measurement. The present invention has a structure described below.

A wear measurement device for a tire detects the magnetic field of a magnet embedded in a tread portion of a tire and measures the degree of wear of the tire. The wear measurement device for a tire has: a first magnetic field detection portion disposed at a position at which a magnetic field from the magnet can be detected; and a second magnetic field detection portion disposed at a position at which the second magnetic field detection portion is affected differently from the first magnetic field detection portion by the magnetic field of the magnet.

Since the second magnetic field detection portion is provided besides the first magnetic field detection portion, two detection values are obtained that have been similarly affected by an external magnetic field. Therefore, when the difference between the detection values of these two magnetic fields is used, for example, the influence of the external magnetic field in wear measurement can be eliminated.

The second magnetic field detection portion may be disposed at a position at which there is no influence of the magnetic field of the magnet.

In this structure, the detection by the second magnetic field detection portion reflects only the external magnetic field different from the magnetic field from the magnet. Therefore, when the difference between detection values of the first magnetic field detection portion and second magnetic field detection portion is used, the influence of the external magnetic field can be easily eliminated.

The first magnetic field detection portion and second magnetic field detection portion may be disposed side by side on the inner side surface of the tire in a direction orthogonal to the rotational direction of the tire.

In this structure, the influence of the earth's magnetism on the first magnetic field detection portion and that influence on the second magnetic field detection portion become the same. Therefore, when the detection values detected at the same time by the first magnetic field detection portion and second magnetic field detection portion are used, the influence of the external magnetic field in wear measurement can be eliminated.

It is preferable for each of the first magnetic field detection portion and second magnetic field detection portion to be capable of detecting a magnetic field in the directions of three mutually orthogonal axes. In this case, the first magnetic field detection portion and second magnetic field detection portion are preferably placed in the same plane and each of the three sensitivity axes of the first magnetic field detection portion and second magnetic field detection portion is preferably placed so as to be oriented in the same direction between the first magnetic field detection portion and the second magnetic field detection portion.

In this structure, even if there is a slight deviation in the attachment position or inclination of the magnet in the tread portion or of the first magnetic field detection portion and second magnetic field detection portion in the tire, when a change in the combined magnetic field of three axes is compared, it becomes possible to precisely measure the state of wear of the tire.

The wear measurement device may have a control unit that infers the degree of wear of the tire according to a first detection value detected by the first magnetic field detection portion and a second detection value detected by the second magnetic field detection portion. In this case, the wear measurement device may have a storage unit that stores a table that indicates a relationship between the magnetic field of the magnet embedded in the tread portion of the tire and the amount of wear of the tread portion. The control unit may measure the degree of wear of the tire according to the first detection value detected by the first magnetic field detection portion, the second detection value detected by the second magnetic field detection portion, and the table.

When the wear measurement device has the control unit, the measurement result of the degree of wear of the tire can be output.

In a wear measurement method that detects the magnetic field of a magnet embedded in a tread portion of a tire and measures the degree of wear of the tire, the wear measurement method: causes a first magnetic field detection portion to detect a first magnetic field, the first magnetic field detection portion being disposed at a position at which a magnetic field of the magnet can be detected; causes a second magnetic field detection portion to detect a second magnetic field, the second magnetic field detection portion being disposed at a position at which the second magnetic field detection portion is affected differently from the first magnetic field detection portion by the magnetic field of the magnet; and measures the degree of wear of the tire according to the first magnetic field and the second magnetic field.

The wear measurement device, in the present invention, for a tire can detect two magnetic fields with a first magnetic field detection portion and a second detection portion and can thereby eliminate the influence of an external magnetic field such as the earth's magnetism from the detected magnetic fields. Therefore, the wear measurement device can precisely detect wear of the tire.

BRIEF DESCRIPTION OF THE DRAWINGS

FIG. 3 is a sectional view that explains a state in which a conventional tire wear measurement device is attached to a tire.

DESCRIPTION OF THE PREFERRED EMBODIMENTS

Figure 1:
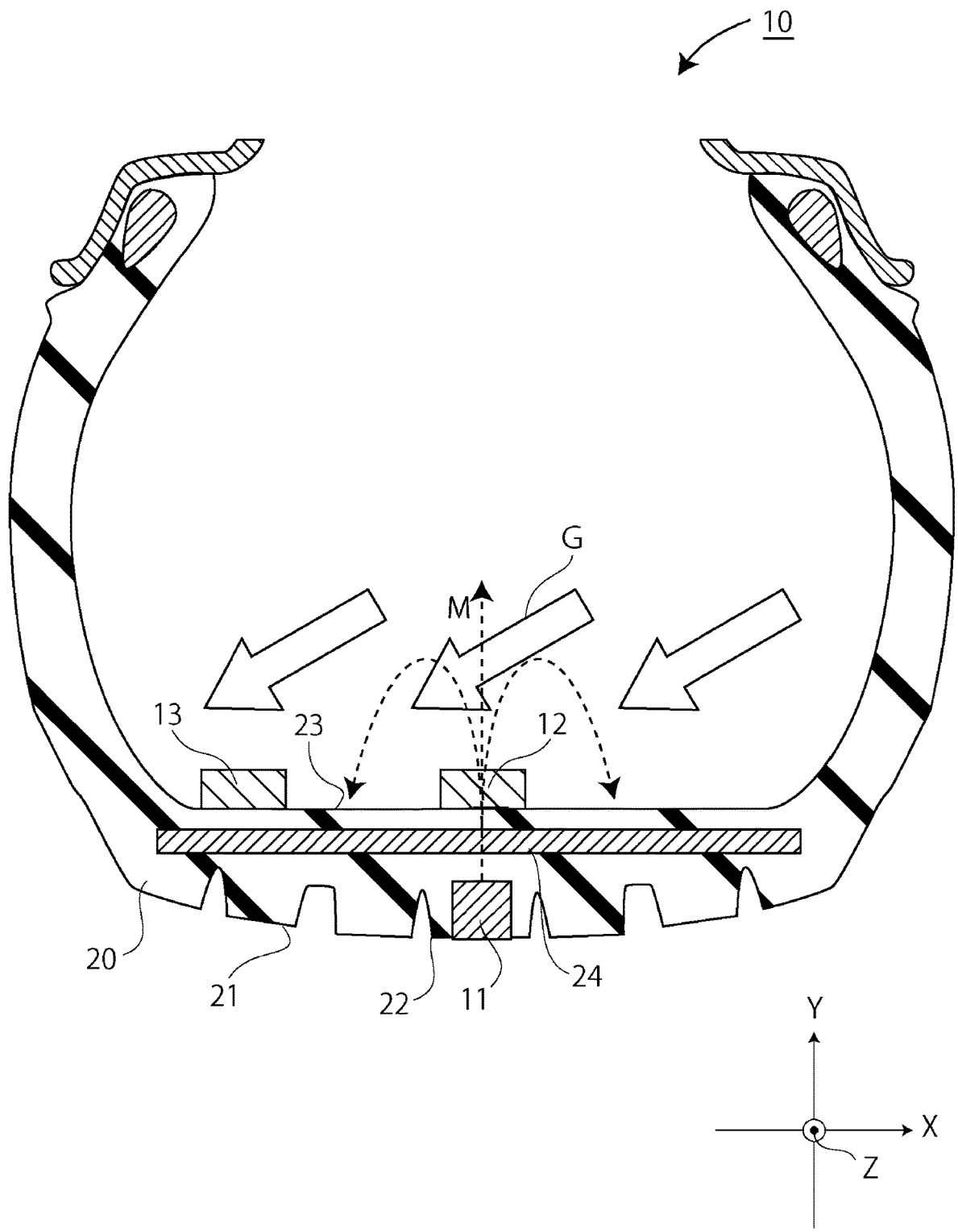
FIG. 1 is a sectional view that explains a state in which a tire wear measurement device, according to an embodiment is attached to a tire.

An embodiment of the present invention will be described below with reference to the drawings. In the description below, like members will be denoted by like reference numerals and descriptions will be appropriately omitted.

FIG. 3 is a sectional view that explains a state in which a conventional wear measurement device for a tire is attached to a tire. With the wear measurement device 100 for a tire, as a magnetic body 111 embedded in a tread portion 22 on the outer side surface 21 of a tire 20 wears, a magnetic field M measured by a magnetic field detection portion 112, the magnetic field M being indicated by the dashed lines in the drawing, changes, as illustrated in the drawing. This change in the magnetic field M is detected to measure the wear state of the tread portion 22.

However, in an environment in which the tire 20 is actually used, an external magnetic field G such as the earth's magnetism is present, besides the magnetic field M. In the measurement of the magnetic field M, the external magnetic field G is noise, by which precision in the measurement of the magnetic field M of the magnetic field detection portion 112 is lowered. When the magnetic field detection portion 112 attached to the inner side surface 23 of the tire 20 measures the magnetic field M, the magnetic field M is changed by a steel wire layer 24 in the tire 20. Therefore, the external magnetic field G largely affects the measurement of the magnetic field M.

In view of this, a wear measurement device, for a tire, in this embodiment has two magnetic field detection portions to eliminate the influence of the external magnetic field G. The wear measurement device, for a tire, in the present invention will be described below.

FIG. 1 is a sectional view that explains a state in which the wear measurement device, for a tire, according to an embodiment is attached to the tire 20. As illustrated in the drawing, the wear measurement device 10 for a tire detects a change in the magnetic field M due to wear of a magnetic body 11 embedded in the tread portion 22 on the outer side surface 21 of the tire 20, and measures the degree of wear of the tread portion 22 of the tire 20 by using the detected magnetic field M. Specifically, when the magnetic body 11 wears together with the tread portion 22, the size of the magnetic body 11 is reduced, causing the magnetic field M to change according to the change in the size of the magnetic body 11. Therefore, by seeing the change in the magnetic field M, the degree of wear of the tread portion 22 of the tire 20 can be measured.

The magnetic body 11 is embedded in part of the tread portion 22 on the outer side surface 21 of the tire 20. Therefore, the magnetic body 11 wears as the tread portion 22 wears. As described above, the magnetic field M formed by the magnetic body 11 changes as the tread portion 22 wears.

On the inner side surface 23 of the tire 20, a first magnetic field detection portion 12 is placed immediately above the magnetic body 11, which is largely affected by the magnetic field M generated by the magnetic body 11, that is, at a position at which the first magnetic field detection portion 12 and magnetic body 11 overlap when viewed from the Y-axis direction. The first magnetic field detection portion 12 is used to detect the magnetic field M, which changes along with wear, of the magnetic body 11, so that wear of the tread portion 22 can be measured.

However, the magnetic field detected by the first magnetic field detection portion 12 includes the external magnetic field G besides the magnetic field M of the magnetic body 11. This external magnetic field G becomes the cause of a drop in measurement precision. In the wear measurement device 10 for a tire, therefore, a second magnetic field detection portion 13 is provided at a position at which the second magnetic field detection portion 13 is affected differently from the first magnetic field detection portion 12 by the magnetic field M of the magnetic body 11.

In this embodiment, the second magnetic field detection portion 13 may be disposed at a position at which there is no influence of the magnetic field M of the magnetic body 11. Therefore, the magnetic field M, of the magnetic body 11, from which the external magnetic field G has been removed can be measured by using the difference between a first detection value detected by the first magnetic field detection portion 12 and a second detection value detected by the second magnetic field detection portion 13. Therefore, it is possible to suppress a drop in detection precision due to the influence of the external magnetic field G and to precisely measure wear of the tread portion 22 on the outer side surface 21 of the tire 20. The detection values for magnetic fields detected by the first magnetic field detection portion 12 and second magnetic field detection portion 13 refer to the value of a magnetic flux density or a magnetic field intensity.

The position at which there is no influence of the magnetic field of the magnetic body 11 embedded in the tread portion 22 refers to a position at which the magnetic flux density of the magnetic field of the magnetic body 11 is essentially zero. Here, when the magnetic flux density is essentially zero, this means that the magnetic flux density of the magnetic field of the magnetic body 11 is a sufficiently small value with respect to the magnetic flux density of the external magnetic field. In the present invention, when the magnetic flux density is essentially zero, this means that the magnetic flux density of the magnetic field of the magnetic body 11 is sufficiently smaller than the magnetic flux density of the earth's magnetism, which is an external magnetic field. In Tokyo, for example, the magnetic flux density of the earth's magnetism is about 0.5 mT, so it can be said that there is no influence of the magnetic field of the magnetic body 11 at a position at which the magnetic flux density of the magnetic field of the magnetic body 11 is 0.05 mT, which is one-tenth of the magnetic flux density of the earth's magnetism, or less. In the present invention, therefore, a position at which the magnetic flux density of the magnetic field generated by the magnetic body 11 is 0.05 mT or less will refer to a position at which there is no influence of the magnetic field of the magnetic body 11. When the magnetic field M of the magnetic body 11 changes as the magnetic body 11 wears, a position at which the influence of the magnetic field of the magnetic body 11 is reduced to one-tenth or less of the magnetic flux density of the earth's magnetism, which is for example, 0.05 mT or less, at all points in time from when the tire is new until total wear is reached will be taken as the position at which there is no influence of the magnetic field of the magnetic body 11.

When the second magnetic field detection portion 13 is provided at a position at which there is no influence of the magnetic field of the magnetic body 11, the second detection value detected by the second magnetic field detection portion 13 reflects only the external magnetic field G. Therefore, when the second detection value of the second magnetic field detection portion 13 is reduced, only the influence of the external magnetic field can be eliminated from the first detection value of the first magnetic field detection portion 12. Therefore, a change, in the magnetic field M, caused by wear of the magnetic body 11 disposed in the tread portion 22 can be precisely measured.

The positions of the first magnetic field detection portion 12 and second magnetic field detection portion 13 relative to the ground cyclically change along with the rotation of the tire 20. Therefore, the influence of the earth's magnetism on the detection values also cyclically changes. In view of this, the first magnetic field detection portion 12 and second magnetic field detection portion 13 may be disposed side by side in the width direction (X-axis direction) of the tire 20, the width direction being orthogonal to the rotational direction (Z-axis direction) of the tire 20 on the inner side surface 23. Surfaces (outer side surface 21) opposite to the places at which the first magnetic field detection portion 12 and second magnetic field detection portion 13 are attached come into contact with the ground at the same time along with the rotation of the tire 20.

Since the first magnetic field detection portion 12 and second magnetic field detection portion 13 are disposed side by side in the width direction orthogonal to the rotational direction of the tire 20, that is, on the same straight line in the X-axis direction as described above, the positions of the first magnetic field detection portion 12 and second magnetic field detection portion 13 relative to the ground similarly change. Therefore, the first detection value of the first magnetic field detection portion 12 and the second detection value of the second magnetic field detection portion 13, which are measured at the same time, are similarly affected by the external magnetic field G. Therefore, when the difference is used between the first detection value and the second detection value, which were measured at the same time, the influence of the external magnetic field G can be eliminated.

In the embodiment described above, an aspect has been described in which the second magnetic field detection portion 13 is disposed at a position at which there is no influence of the magnetic field M of the magnetic body 11. However, the second magnetic field detection portion 13 only needs to be disposed at a position at which the second magnetic field detection portion 13 is affected differently from the first magnetic field detection portion 12 by the magnetic field M of the magnetic body 11 embedded in the tread portion 22. When the influence of the magnetic field M differs, wear of the magnetic body 11 can be measured by using the first detection value and second detection value. For example, wear of the magnetic body 11 can be measured according to the magnetic field M obtained by using the first detection value and second detection value.

The first magnetic field detection portion 12 and second magnetic field detection portion 13 each have a magnetoresistance effect element that measures a magnetic field and the resistance of which changes depending on the direction and intensity of the magnetic field. Examples of magnetoresistance effect elements include a giant magneto-resistance (GMR) element and a tunnel magneto-resistance (TMR) element. Measurement by the first magnetic field detection portion 12 and second magnetic field detection portion 13 does not need to be continuously performed in real time, but may be performed on and off at certain time intervals. Alternatively, measurement may be performed in response to an external command received through a wireless communication means (not illustrated). When measurement is performed at certain time intervals or in response to an external command, power consumption can be suppressed when compared with continuous measurement. A hall element may be used as the magnetoresistance effect element included in the first magnetic field detection portion 12 and second magnetic field detection portion 13, and a change in the intensity of the magnetic flux may be measured.

A magneto-impedance effect element may be used to measure a change in impedance due to a change in the magnetic field.

Each of the first magnetic field detection portion 12 and second magnetic field detection portion 13 may be structured so that it can measure a magnetic field in the directions of three axes (X axis, Y axis, and Z axis), which are mutually orthogonal. When a one-axis sensor is used, if the magnetic body 11, first magnetic field detection portion 12, and second magnetic field detection portion 13 deviate from their predetermined positions, part of the magnetism that is originally supposed to be detected on a predetermined detection axis is projected to another axis, which is not a detection axis. Therefore, if the magnetic body 11, first magnetic field detection portion 12, and second magnetic field detection portion 13 deviate from their predetermined positions during or after the placement of them, error caused by the deviation becomes large in the measurement of the magnetism. Therefore, from the viewpoint of suppressing measurement error caused by the deviation described above, the first magnetic field detection portion 12 and second magnetic field detection portion 13 preferably measure a combined magnetic field on three axes.

Specifically, if the magnetic body 11, first magnetic field detection portion 12, and second magnetic field detection portion 13 are placed at positions deviating from their predetermined positions, part of a magnetism that should be detected on a predetermined detection axis (X axis, for example) is projected to other axes (Y axis and Z axis, which are orthogonal to the X axis, for example). Even in this case as well, however, if a combined magnetic field on the three axes (X axis, Y axis, and Z axis) is measured, the magnetism projected to the Y axis and Z axis is measured as part of the combined magnetic field without being eliminated from objects under measurement, so detection precision is improved. The first magnetic field detection portion 12 and second magnetic field detection portion 13 may be structured by placing three one-axis detection sensors, one sensor in each axial direction of the three axes.

The first magnetic field detection portion 12 and second magnetic field detection portion 13 may be placed in the same plane, and each of their three sensitivity axes may be oriented in the same direction between the first magnetic field detection portion 12 and the second magnetic field detection portion 13. For the X-axis component, Y-axis component, and Z-axis component, a difference is taken between the first detection value of the first magnetic field detection portion 12 and the second detection value of the second magnetic field detection portion 13 to obtain a combined magnetic field of the differences. Then, the amount of wear is inferred. Therefore, wear of the tread portion 22 of the tire 20 can be precisely detected. Even if there is an inclination of the magnetic body 11 or a positional deviation of the sensor in the first magnetic field detection portion 12 and second magnetic field detection portion 13, when the combined magnetic field of the three axes is measured as described above, it becomes possible to precisely measure wear of the tread portion 22 of the tire 20 according to a change in the magnetic field M.

The wear measurement device 10 may output information, obtained in magnetic field measurement by the first magnetic field detection portion 12 and second magnetic field detection portion 13, about wear of the tire 20 to an on-board device or the like through a wireless communication means or the like. Specifically, it is possible to transmit information about a result of measurement by the first magnetic field detection portion 12 and second magnetic field detection portion 13 to an on-board device and to receive information from the on-board device, through a wireless communication means. Transmission and reception of information through communication between the wear measurement device 10 for a tire and an external device are controlled by a central processing unit CPU (not illustrated).

In the embodiment described above, an aspect has been described in which the first magnetic field detection portion 12 and second magnetic field detection portion 13 are disposed on the inner side surface 23 of the tire 20. In another aspect, however, the first magnetic field detection portion 12 and second magnetic field detection portion 13 may be disposed at positions other than on the inner side surface 23 of the tire 20, which are, for example, on the vehicle side.

Variation

Figure 2:
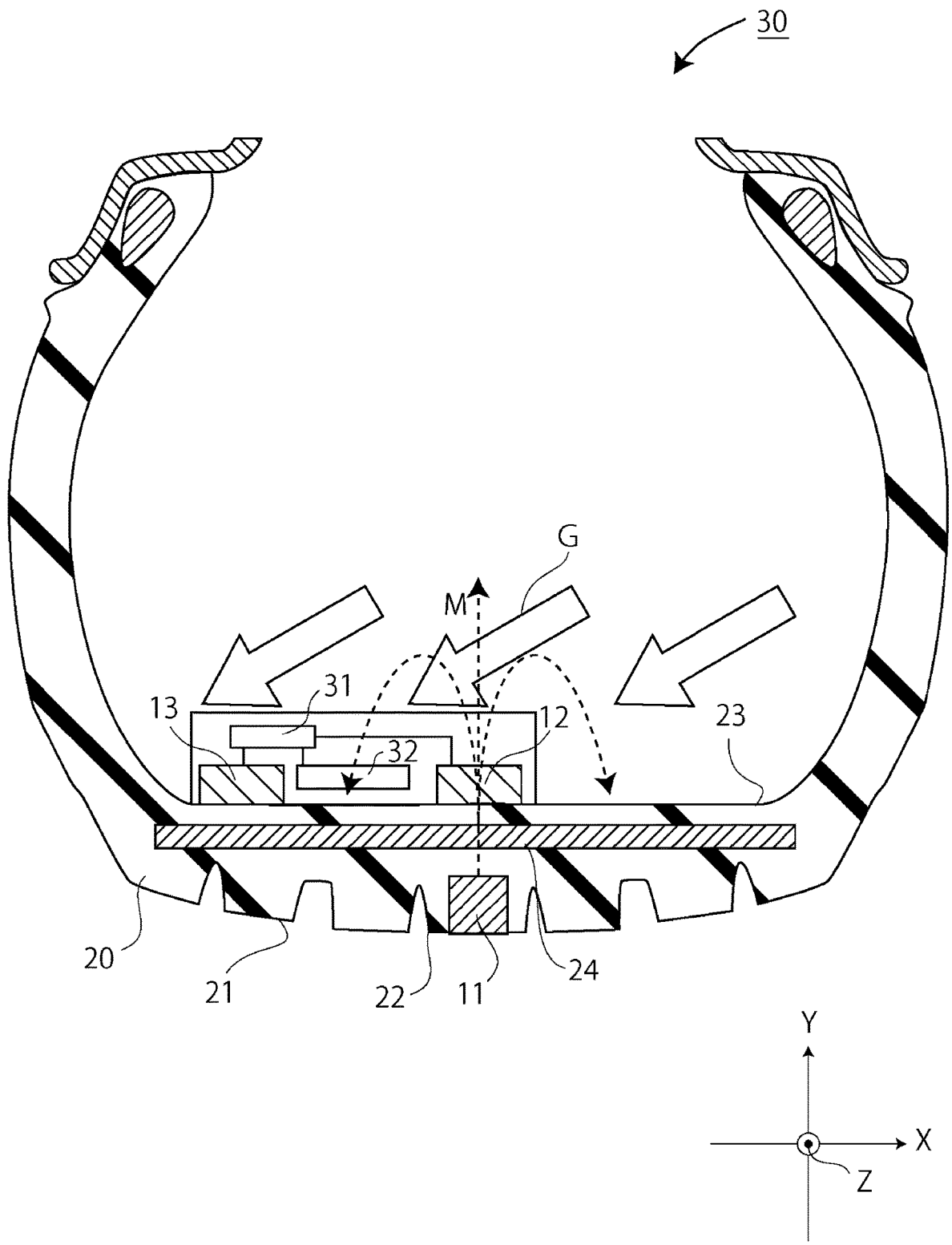
FIG. 2 is a sectional view that explains a variation of the tire wear measurement device.

FIG. 2 is a sectional view that explains a variation of the wear measurement device 10, according to the present invention, for a tire. A wear measurement device 30, illustrated in the drawing, for a tire differs from the wear measurement device 10 in FIG. 1 in that the wear measurement device 30 further has a control unit 31 and a storage unit 32.

The control unit 31 may measure the degree of wear of the tire 20 according to the first detection value detected by the first magnetic field detection portion 12, the second detection value detected by the second magnetic field detection portion 13, and a table in the storage unit 32. The control unit 31 includes a CPU and the like.

The storage unit 32 may have a table used in calculation of the amount of wear of the magnetic body 11 embedded in the tread portion 22 on the tire 20, together with the first detection value detected by the first magnetic field detection portion 12 and the second detection value detected by the second magnetic field detection portion 13. A read-only memory (ROM) such as, for example, a mask ROM, an electrically erasable programmable ROM (EEPROM), or a flash memory, can be used as the storage unit 32.

Measurement Method

The present invention can also be practiced as a wear measurement method for a tire. A tire wear measurement method in this embodiment is to detect the magnetic field M of the magnetic body 11 embedded in the tread portion 22 of the tire 20 and then measure the degree of wear of the tire 20 from a change in the magnetic field M. A first magnetic field is detected by the first magnetic field detection portion 12 placed at a position at which the magnetic field M of the magnetic body 11 can be detected, a second magnetic field is detected by the second magnetic field detection portion 13 disposed at a position at which the second magnetic field detection portion 13 is affected differently from the first magnetic field detection portion 12 by the magnetic field M of the magnetic body 11, and the degree of wear of the tire 20 is measured according to the first detection value used in the detection of the first magnetic field and the second detection value used in the detection of the second magnetic field.

The table stored in the storage unit 32 indicates a relationship, obtained in advance as in STEP 1 to STEP 3 below, between the magnetic field M and the degree of wear for in an initial state of the tire 20 and for each of various degrees of wear.

<STEP 1>

Output values of the first magnetic field detection portion 12 and second magnetic field detection portion 13 are read out for each sensitivity axis. Specifically, an output A (Xa, Ya, Za) of the axes in the first magnetic field measured by the first magnetic field detection portion 12 is obtained and an output B (Xb, Yb, Zb) of the axes in the second magnetic field measured by the second magnetic field detection portion 13 is also obtained. When, for example, the second magnetic field detection portion 13 was placed at a position at which there is no influence of the magnetic field M, it can be said that the output A was affected by both the magnetic field M and the external magnetic field G and that the output B was affected only by the external magnetic field G.

<STEP 2>

Differential data, which is the difference between output values of the first magnetic field detection portion 12 and second magnetic field detection portion 13 on each sensitivity axis, is obtained. Specifically, a difference C (Xc=Xa−Xb, Yc=Ya−Yb, Zc=Za−Zb) between the output A and the output B is obtained. When, for example, the second magnetic field detection portion 13 was placed at a position at which there is no influence of the magnetic field M, it can be said that in the difference C between the output A and the output B, the influence of the external magnetic field G has been eliminated and only the influence of the magnetic field M has been reflected.

<STEP 3>

A combined magnetic field m is obtained from the differential data. Specifically, the combined magnetic field m $(=(Xc^2+Yc^2+Zx^2)^{1/2})$, which is the measured value of the magnetic field M of the magnetic body 11, is obtained according to the difference C.

The control unit 31 can measure the amount w of wear of the tire 20 according to the combined magnetic field m obtained from the first magnetic field and second magnetic field and to the table, stored in the storage unit 32, which indicates a relationship between the combined magnetic field m and the amount w of wear of the tread portion 22.

A reference used as the table is not limited to a reference that continuously indicates changes in the state of the tire 20, but may be a reference that indicates changes in the state of the tire 20 in steps. For example, the state of wear of the tire 20 may be broadly classified into a like-new state, a state in which wear has progressed, and a state in which replacement is needed, with respect to the necessity of tire replacement, ranges, of the combined magnetic field m, that fit to the classifications of the state of wear of the tire may be set, and a matrix of these ranges may be used as the table.

A slip sign, which indicates that wear of the tire has progressed and the time of replacement has come, appears on the tire surface when, for example, the depth of the groove has reduced to 1.6 mm and the groove has had the same height as the surface of the tread portion. Therefore, in this example, the state of the groove with a depth of 3.0 mm or more may be classified as the like-new state, the state of the groove with a depth of 1.6 to less than 3.0 mm may be classified as the state in which wear has progressed, and the state of the groove with a depth of less than 1.6 mm may be classified as the state in which replacement is needed.

As described above, in the wear measurement method, in this embodiment, for a tire, a difference is taken between the first and second detection values for each of the three axis components, according to the first magnetic field detected by the first magnetic field detection portion 12 placed immediately above the magnetic body 11 and to the second magnetic field of the second magnetic field detection portion 13 placed at a position at which there is no influence of the magnetic field M of the magnetic body 11; the combined magnetic field m of the differences is obtained; and the amount of wear of the tire 20 is inferred. Since a difference is taken for each of the three axis components, the influence of the external magnetic field G included in the first detection value is eliminated, so the amount of wear of the tire 20 can be precisely measured. Therefore, it becomes possible to precisely detect the time of the rotation of the tire 20 and the time of the replacement of the tire 20.

The present invention can be applied to a wear measurement device that can measure the state of wear of a tire without relying on a visual way.

What is claimed is:

1. A wear measurement device for measuring a degree of wear of a tire, by detecting a magnetic field of a magnet embedded in a tread portion of the tire, the wear measurement device comprising:
    a first magnetic field detection element disposed at a first position for detecting the magnetic field from the magnet;
    a second magnetic field detection element disposed at a second position at which the second magnetic field detection element is affected by the magnetic filed of the magnet differently from the first magnetic field detection element is affected by the magnetic field of the magnet; and
    a control unit configured to measure the degree of wear of the tire based on a first detection value detected by the first magnetic field detection element and a second detection value detected by the second magnetic field detection element,
    wherein the first magnetic field at the first position includes a first magnetic field component from the magnet and a first external magnet field component, while the second magnetic field at the second position includes a second magnetic field component from the magnet and a second external magnetic field component which is substantially the same as the first external magnetic field component,
    and wherein the control unit is further configured to obtain a difference between the detected values of the first magnetic field and the second magnetic field, thereby improving accuracy of the measurement of the degree of wear of the tire.

2. The wear measurement device according to claim 1, wherein the second position is such a position that at which the magnetic field of the magnet has substantially no influence on the second magnetic field detection element.

3. The wear measurement device according to claim 1, wherein the first magnetic field detection element and the second magnetic field detection element are disposed on an inner surface of the tire side by side in a direction orthogonal to a rotational direction of the tire.

4. The wear measurement device according to claim 1, wherein each of the first magnetic field detection element and the second magnetic field detection element is capable of detecting a magnetic field in directions of three mutually orthogonal axes.

5. The wear measurement device according to claim 4, wherein:
    the first magnetic field detection element and the second magnetic field detection element are placed in a same plane; and
    three sensitivity axes of the first magnetic field detection are oriented in same directions, respectively, as three sensitivity axes of the second magnetic field detection element are oriented.

6. The wear measurement device according to claim 1, further comprising:
    a storage unit that stores a table providing a relationship between a value of the magnetic field of the magnet and an amount of wear of the tread portion,
    wherein the control unit is configured to determine the degree of wear of the tire based on the first detection value, the second detection value, and the table.

7. A wear measurement method for measuring a degree of wear of a tire, by detecting a magnetic field of a magnet embedded in a tread portion of the tire, the method comprising:
    detecting a first magnetic field by a first magnetic field detection element disposed at a first position for detecting a magnetic field of the magnet;
    detecting a second magnetic field by a second magnetic field detection element disposed at a second position at which the second magnetic field detection element is affected by the magnetic field of the magnet differently from the first magnetic field detection element is affected by the magnetic field of the magnet; and
    measuring the degree of wear of the tire based on a detected value of the first magnetic field and a detected value of the second magnetic field,
    wherein the first magnetic field at the first position includes a first magnetic field component from the magnet and a first external magnet field component, while the second magnetic field at the second position includes a second magnetic field component from the magnet and a second external magnetic field component which is substantially the same as the first external magnetic field component,
    and wherein the measuring the degree of ware of tire includes:
        obtaining a difference between the detected values of the first magnetic field and the second magnetic field, thereby improving accuracy of the measuring of the degree of wear of the tire.

* * * * *